United States Patent [19]

Miwa

[11] 4,315,138

[45] Feb. 9, 1982

[54] ELECTRIC RICE COOKER

[75] Inventor: Yoshiyuki Miwa, Aichi, Japan

[73] Assignee: Tokyo Shibaura Denki Kabushiki Kaisha, Kawasaki, Japan

[21] Appl. No.: 143,122

[22] Filed: Apr. 23, 1980

[30] Foreign Application Priority Data

May 21, 1979 [JP] Japan .................................. 54-63117
May 22, 1979 [JP] Japan .............................. 54-69369[U]

[51] Int. Cl.³ ............................................. F27D 11/02
[52] U.S. Cl. ...................................... 219/441; 99/333; 219/433; 219/438; 219/492; 219/494
[58] Field of Search ............... 219/429, 430, 433, 438, 219/439, 441, 442, 492, 493, 494, 509, 510; 99/332, 333

[56] References Cited

U.S. PATENT DOCUMENTS

| 2,597,695 | 5/1952 | Braski et al. ......................... 219/441 |
| 2,753,436 | 7/1956 | Schwaneke ........................ 219/441 |
| 2,952,764 | 9/1960 | Minami ............................ 219/441 X |
| 3,190,989 | 6/1965 | Komatsu ........................... 219/441 X |
| 3,904,852 | 9/1975 | Rivelli et al. ...................... 219/442 |

FOREIGN PATENT DOCUMENTS 2025167  1/1980  United Kingdom ................ 219/441

Primary Examiner—Volodymyr Y. Mayewsky
Attorney, Agent, or Firm—Cushman, Darby & Cushman

[57] ABSTRACT

An electric rice cooker comprising a heater for heating a kettle and contents thereof, an electric timer which controls the energization and deenergization of the heater in response to the temperature of the kettle and a heat isolator for securing the timer and for preventing heat from being transferred from the heater to the timer.

10 Claims, 5 Drawing Figures

ELECTRIC RICE COOKER

This invention relates to an electric rice cooker, and more particularly to an improvement in an electric rice cooker.

It is well known that the best way to boil rice in a cooker of most excellent taste is to heat a cooking kettle and rice twice, so called twice cooking with a electric timer for controlling the deenergization and reenergization of a heater, as disclosed for example in Mr. Aoshima's prior U.S. Pat. Application Ser. No. 128,244.

However, such timer has a drawback that the timer works irregularly because the timer is heated by the heater.

It is an object of this invention to provide an electric rice cooker which has a heat isolator for preventing heat from being transferred from the heater to a timer.

It is another object of the invention to provide an electric rice cooker which can easily mount a timer on a face cover.

It is still another object of the invention to provide an electric rice cooker which can be easily connected by a wire to a timer.

It is a further object of the invention to provide an electric rice cooker which has a water isolator cooperating with a heat isolator for preventing the timer from getting wet.

It is still a further object of the invention to provide an electric rice cooker which has a bottom having a receptacle for covering a timer.

In this invention, a heat isolator for securing the timer prevents the heat from being transferred from the heater to the timer.

Figure 1:
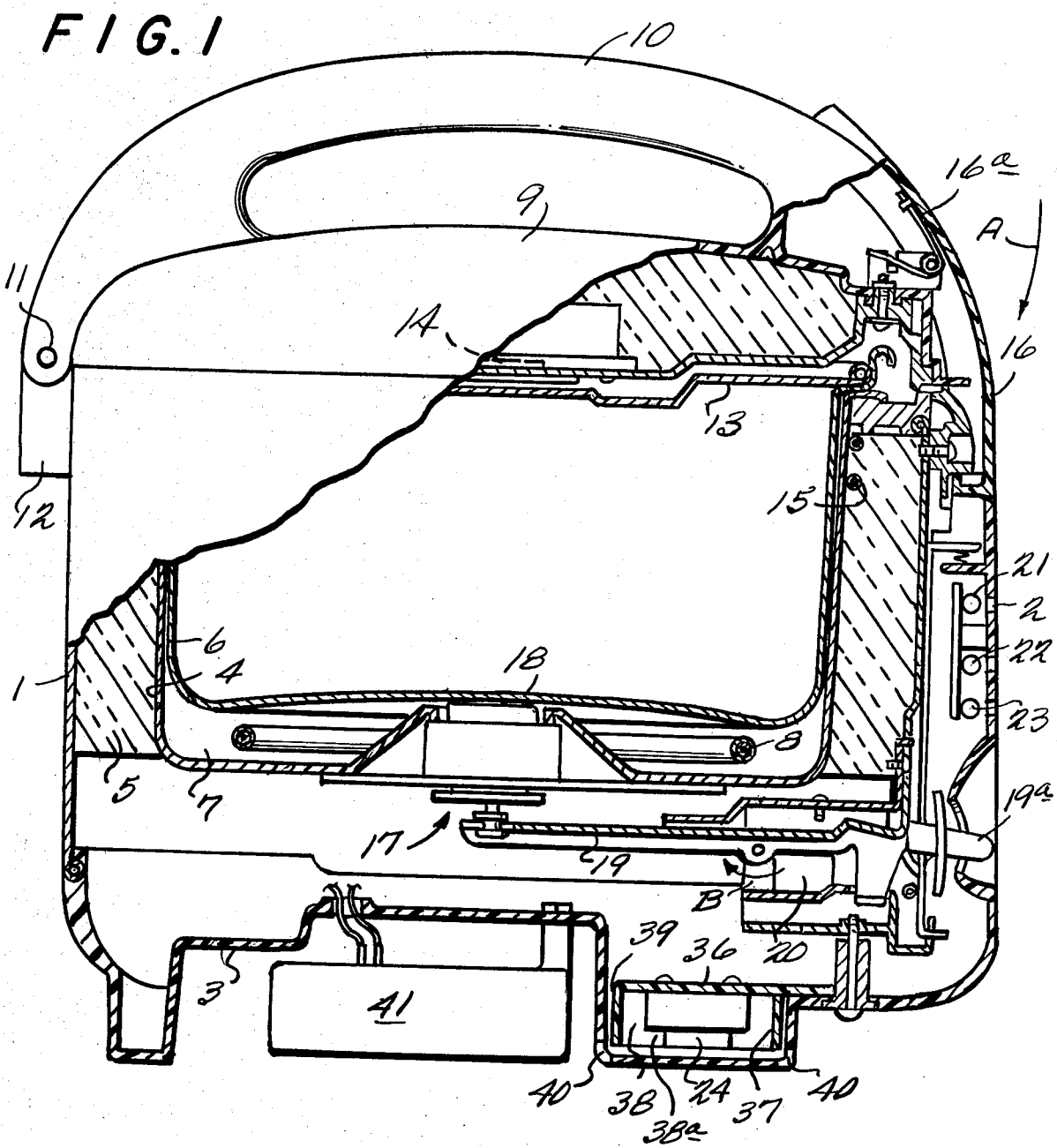
FIG. 1 is a partly sectional view of an electric rice cooker according to this invention.
Figure 3:
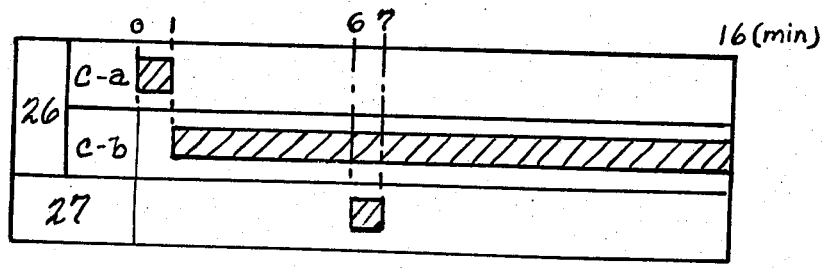
FIG. 3 is a timing chart of a timer according to the invention.
Figure 2:
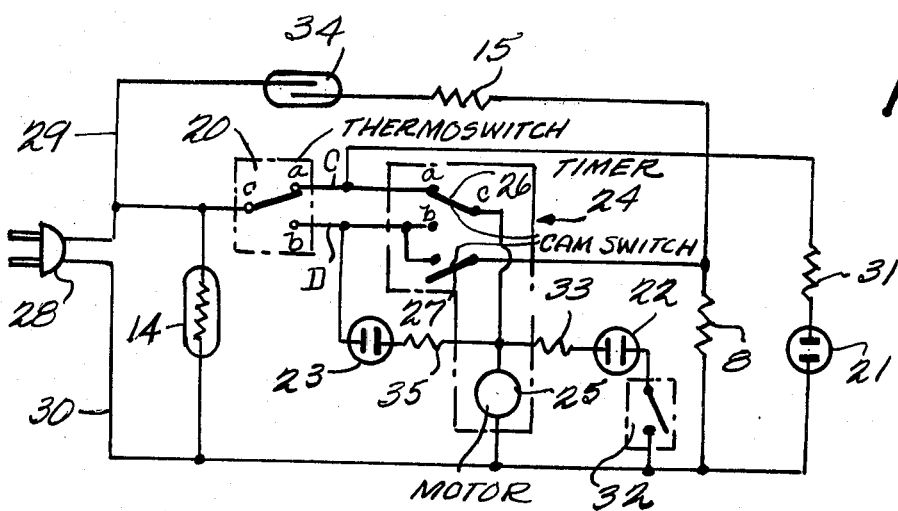
FIG. 2 is a wiring diagram of the electric rice cooker according to the invention.

Now there will be described of this invention referring to FIG. 1 to FIG. 3. An outer case 1 is formed substantially cylindrical. A face cover 2 is mounted on the front portion of outer case 1 for covering the front portion and electric parts therein and extending to the upper and lower sides. A bottom frame 3 is mounted on the lower portion of the outer case 1 and face cover 2. Face cover 2 and bottom frame 3 will be described more fully hereafter.

An inner case 4 is separated from the inside of outer case 1 by a heat isolator 5. A kettle 6 is detachably located in inner case 4 and supported at its top portion by the top portion of inner case 4 to form a predetermined space 7 between the bottom of kettle 6 and the bottom of case 4. A sheathed heater 8 is located in space 7, namely in the bottom of inner case 4 for heating kettle 6 with radiant heat thereof. An outer lid 9 having a integrally molded handle 10 on its upper portion is pivotally mounted by a hinge 12 which is secured on the top of outer case 1 by a pivot 11. An inner lid 13 is secured to the inner surface of outer lid 9 for covering the opening of kettle 6. A lid heater 14 is mounted on inner lid 13 and a warming heater 15 is mounted about the outer surface of the upper portion of inner case 4. A lock lever 16 is pivotally mounted on the end portion of handle and is usually urged by a coil spring 16a in the direction shown by arrow A (see FIG. 1).

A thermoswitch 17 is provided for deenergizing heater 8. Thermoswitch 17 includes a magnetic thermosensor 18 mounted on inner case 4 and urged into contact with the outer surface of kettle 6 for detecting the bottom temperature P of kettle 6. The end of a operating lever 19 is connected to thermo-sensor 18. A knob 19a is mounted on the tip of lever 19 and projects through face cover 2. A microswitch 20 is operated by lever 19. Thermo-sensor 18 includes a permanent magnet and a magnetic member which rapidly decreases its magnetic permeability at a predetermined temperature, for example 130° C. Then, at room temperature, when lever 19 is rotated by operating knob 19a to the direction indicated by arrow B, the permanent magnet holds the magnetic member for keeping the set position of lever 19 and a contact (c-a) of microswitch 20 closed as shown in FIG. 2. At about the predetermined temperature, lever 19 is rotated to its reset position by a spring (not shown) because the magnetic attraction between the permanent magnet and the magnetic member vanishes and a contact (c-b) of microswitch 20 is closed. First, second and third display lamps 21, 22 and 23 are located in the face cover 2 and display "main cooking", "ripening or twice cooking" and "warming", respectively.

An electric timer 24 (the securing thereof will be described more fully hereafter), for carrying out the twice cooking repeats its predetermined (sixteen minutes in this embodiment) timer action according to one rotation of the shaft of a timer motor 25 when timer motor 25 is energized. During sixteen minutes or one timer cycle of timer 24, a contact (c-a) of a cam switch 26 is closed for one minute at the beginning of the timer action and a contact (c-b) of switch 26 is closed for fifteen minutes. A cam switch 27 is closed one minute after five minutes pass from the beginning of the timer action (see FIG. 3). Referring to FIG. 2, one end of a plug 28 is connected to a line 29 and the other end thereof is connected to a line 30. Line 29 is connected to a main cooking line C through contact (c-a) of microswitch 20 and is connected to a twice cooking line D through contact (c-b) of microswitch 20. Heater 8 is connected between main cooking line C and line 30, and a series circuit of a current-limiting resistance 31 and first display lamp 21 is also connected therebetween in parallel with heater 8. Timer motor 25 is connected between movable contact (c) of switch 26 and line 30, and a series circuit of a current-limiting resistance 33, second display lamp 22 and a cooperating switch 32, which closes with a closing of contact (c-b) of switch 20, is also connected therebetween in parallel with timer motor 25. A series circuit of a thermostat 34 and warming heater 15 is connected in parallel with contact (c-a) of microswitch 20, and a series circuit of third display lamp 23 and a current-limiting resistance 35 is connected between movable contact (c) of switch 26 and line D.

The lower portion of face cover 2 is bent parallel to bottom frame 3 and a heat isolator 36 is formed by integrally molding with the bent portion thereof. A heat isolator 36 includes a circular water isolator 37 integrally molded therewith to form a recess 38. Timer 24 is secured on the under surface of heat isolator 36 through an opening 38a of recess 38. Bottom frame 3 is formed to make a receptacle 39 for receiving heat isolator 36 and water isolator 37, and opening 38a of recess 38 is then covered. Perforations 40 and 40 are formed underneath water isolator 37, namely, at the corner of receptacle 39. Cord reel 41 is secured under bottom frame 3.

The operation of this invention will now be described together with referring FIG. 4 and FIG. 5. FIG. 5 is a temperature-characteristic curve between cooking time T and the bottom temperature P of kettle 6. A predetermined quantity of rice and water according to the quantity of rice are put into kettle 6. After loading kettle 6 into inner case 4, inner lid 13 and outer lid 9 close the opening of outer case 1 and kettle 6 by the rotation of outer lid 9 around pivot 11 as a fulcrum with handling handle 10. Then, outer lid 9 is kept is closed condition by lock lever 16. After plugging in plug 28, thermoswitch 17 is set by operating lever 19. Heater 8 is energized through contact (c-a) of microswitch 20 and main cooking line C. The bottom temperature P of kettle 6 and the contents thereof gradually rise by radiant heat from heater 8 and inner case 4 through space 7. Then, main cooking is progressed and the bottom temperature P rises. At the same time of the beginning of the main cooking, timer 24 begins its timer action for one minute because timer motor 25 is energized through contact (c-a) of cam switch 26 and contact (c-a) of microswitch 20. After one minute passes from the beginning of the timer action, timer 24 stops its timer action temporarily because timer motor 25 is denergized as a result of changing from contact (c-a) to contact (c-b) of cam switch 26. While the main cooking is progressing, first display lamp 21 is lit for displaying "main cooking".

The bottom temperature P of kettle 6 is kept about 100° C. while the water in kettle 6 remains but suddenly rises higher than 100° C. when the water in kettle 6 is absorbed by rice or evaporated to the so-called dried up condition. Then, at about 130° C. of bottom temperature P of kettle 6 (time $t_1$ of FIG. 4 and FIG. 5), the magnetic attraction between the magnetic member and the permanent magnet vanishes because the magnetic permeability of magnetic member of thermo-switch 18 decreases, and lever 19 is rotated to its reset position (opposite to the direction of arrow B). According to the reset of lever 19, the closing of contacts of microswitch 20 are changed from contact (c-a) to contact (c-b) for supplying the power source to "twice cooking" line D. Then, timer 24 resumes its timer action and heater is denergized. The main cooking is now finished and a first ripening of rice is begun. After five minutes pass from the resumption of timer 24 (time $t_2$ of FIG. 4 and FIG. 5), heater 8 is reenergized again for one minute for a "twice cooking" from twice cooking line D through switch 27 because switch 27 is closed for a predetermined time period, namely one minute. After that, a second ripening of rice is begun.

Figure 4:
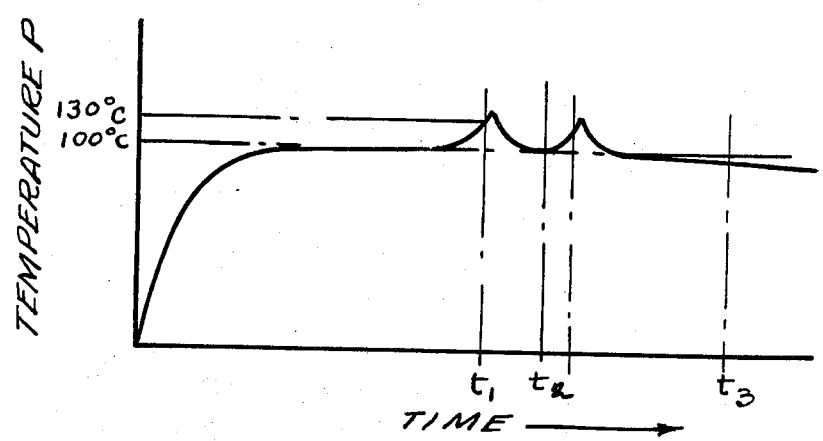
FIG. 4 is a temperature-characteristic curve of the electric rice cooker according to the invention.
Figure 5:
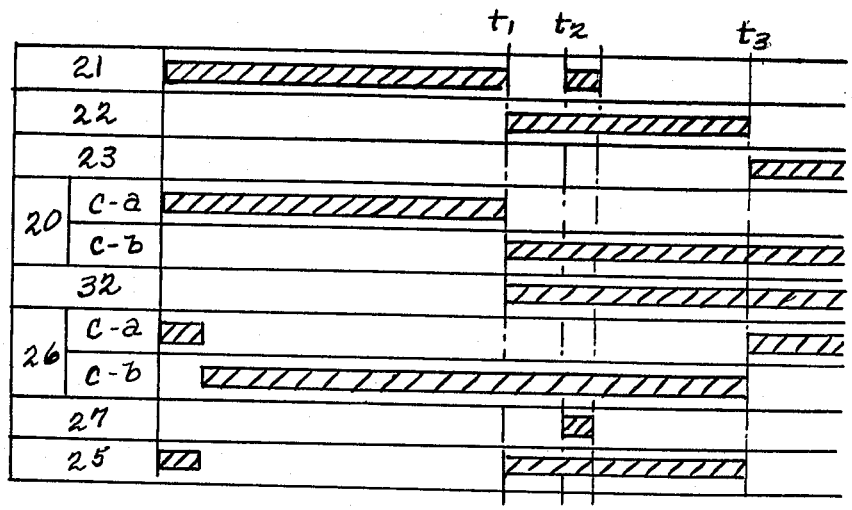
FIG. 5 is a timing chart of the electric rice cooker according to the invention.

After fifteen minutes pass from the resumption of timer 24 (time $t_3$ of FIGS. 4 and 5, contact (c-b) of cam switch 26 opens and contact (c-a) thereof closes. Thus, one timer cycle is finished and timer 24 returns to its condition before cooking. During time period $t_1$ to $t_3$, timer motor 25 is reenergized and switch 32 closes to be cooperated with the closing of contact (c-b) of microswitch 20 so that second display lamp 22 is lit for displaying "ripening or twice cooking". After cooking has been finished, the boiled rice is kept warm by heaters 8 and 15 through thermostat 34 and by lid heater 14. At the same time of the beginning of the warming, second display lamp 22 turns off and third display lamp 23 turns on for displaying "warming" because third display lamp is energized in series with timer motor 25. In this condition, timer motor 25 does not operate because the terminal voltage thereof is not enough to cause operation.

In the foregoing embodiment, timer 24 is protected from the heat generated of heater 8 by heat isolator 36 because timer 24 is secured on the under surface of heat isolator 36. As heat isolator 36 is mounted and supported by face cover 2, timer 24 is easily secured to heat isolator 36 and easily connected to the wire thereto by preliminary assembling with timer 24 and heat isolator 36 before mounting face cover 2 to outer case 1. As circular water isolator 37 which is integrally molded with heat isolator 36 to project downwardly surrounds timer 24 and perforation 40 is formed underneath water isolator 37 and at the corner of receptacle 39, water isolator 37 prevents timer 24 from getting wet and it is possible to drain out the water from perforation 40 even if the water which comes out by the condensation of vapor in the rice cooker flows out of receptacle 39.

What is claimed is:
1. An electric rice cooker comprising:
a cooking kettle for containing water and rice to be cooked;
a removable lid covering the top of said kettle;
electrical heater means mounted adjacent the outside surface of said kettle for heating said kettle and the contents thereof;
thermally insulating frame means for supporting and enclosing said kettle and heater means;
a face cover for covering at least a front portion of said frame means, said frame means and face cover forming a case;
circuit means for connecting and disconnecting said heater means from a source of electrical energy to carry out a plurality of cooking steps in a predetermined period including a thermoswitch for detecting the temperature of said kettle and having a first position connecting said source to said heater for heating said kettle and contents and a second position disconnecting said heater means in response to detection of a predetermined temperature;
electric timer means having controlled switches for controlling connection of said source to said heater means; and
heat isolating means mounted on said case and disposed between said timer means and heater means for preventing heat from said heater means from being transferred to said timer means.
2. The electric rice cooker as in claim 1, wherein said heat isolating means includes water isolating means which surrounds said timer means.
3. The electric rice cooker as in claim 1 or 2, wherein said heat isolating means is integrally molded with said face cover.
4. The electric rice cooker as in claim 1 or 2, wherein said heat isolating means and water isolating means form a recess for mounting said timer means.
5. The electric rice cooker as in claim 4, wherein said case has inner and outer portions, said heater means is between said inner portion and said kettle and said outer portion forms said recess with said heat isolating means between said inner and outer portions.
6. The electric rice cooker as in claim 1, wherein said frame means is formed to provide a receptacle for receiving said heat isolating means and water isolating means.
7. The electric rice cooker as in claim 6, wherein said receptacle has a perforation for draining water.

8. The electric rice cooker as in claim 7, wherein said perforation is formed underneath said water isolating means and at the corner of said receptacle.

9. A cooker as in claim 1, wherein said frame means includes an inner portion and an outer portion and thermal insulation between said cases.

10. A cooker as in claim 1, wherein said timer means is mounted between said inner and outer portions.

* * * * *